United States Patent [19]
McRae

[11] 3,717,170
[45] Feb. 20, 1973

[54] BALL COCK VALVE
[76] Inventor: Edwin C. McRae, Route 1, Cusseta, Ala. 36852
[22] Filed: Oct. 12, 1971
[21] Appl. No.: 188,326

[52] U.S. Cl. .................137/413, 137/426, 137/430, 251/44
[51] Int. Cl. .............................................G05d 9/00
[58] Field of Search......137/412, 413, 418, 420, 421, 137/426, 429, 430, 432; 251/45, 46, 44

[56] References Cited
UNITED STATES PATENTS

| 1,670,300 | 5/1928 | Brooks | 137/413 |
| 2,064,343 | 12/1936 | Finley et al. | 137/413 |
| 2,477,224 | 7/1949 | Wright | 137/430 X |

*Primary Examiner*—Martin P. Schwadron
*Assistant Examiner*—David R. Matthews

[57] ABSTRACT

A ball cock valve is shown having a reciprocating piston therein which forms the main valve closure and wherein the annular space between the piston and its associated cylinder forms a metered passageway into a chamber in back of the piston and wherein a servo operated valve opens and closes said chamber to the atmosphere to cause said piston to move to its closed position when said servo valve is closed and to allow said piston to move to its open position when said servo valve is open.

8 Claims, 2 Drawing Figures

INVENTOR.
Edwin C. McRae

BALL COCK VALVE

The object of my invention is to provide a ball cock valve which, when open, permits full flow of water into a water closet tank until the desired water level is reached and then fully closes to positively shut off further flow of water to the tank. My valve remains fully closed until the water level has dropped about one-half inch at which time the valve opens to again build up the water to the desired level.

One of the disadvantages of the conventional ball cock valve is that it gradually opens and closes so that leakage of water thru the dump valve of the system causes the valve to gradually open just enough to compensate for such leakage. This causes the water to wiredraw across the valve seat thereby reducing the life of the valve seat. My improved valve is either open or closed so the water required to compensate for leakage is admitted in short increments, depending upon the leakage, rather than constantly as in the conventional valve.

A further objective on my invention is to provide a ball cock valve in which water pressure alone actuates the valve and which differs from other valves of this type in that should the water pressure drop below that which is required to actuate the valve, the valve will remain closed to prevent the tank from overflowing.

A further objective of my invention is to provide a servo operated ball cock valve having piston therein which forms the valve disc and wherein the piston is reciprocally mounted in a stationary bore in which it is hydraulicly sealed by means of an O ring. The O ring not only prevents water from flowing lengthwise along the piston but offers sufficient frictional resistance to movement of the piston that a substantial pressure differential must be applied to the opposite ends of the piston to cause it to move either to its closed position or its open position. All of such servo operated valves with which the applicant is familiar provide a flexible diaphragm for operating the closing valve. Such diaphragms will cause the valve to either open or close with a small pressure difference and thus when a slow leak in the system calls for the valve to open it will only open enough to supply the water lost by leakage.

My valve unit requires a small portion of the water which flows thru the valve to be metered thru a small orifice. Such orifices are ordinarily difficult to machine and are apt to be stopped up by sand and grit in domestic water systems. An object of my invention is to provide an improved metering orifice which will admit a small amount of water under line pressure to accuate the valve and which orifice will not clog up under conditions which would ordinarily clog a needle valve or small annular orifice.

Other objects and advantages of this invention will be made more apparent in the following description when considered in connection with the accompanying drawings in which.

Figure 1:
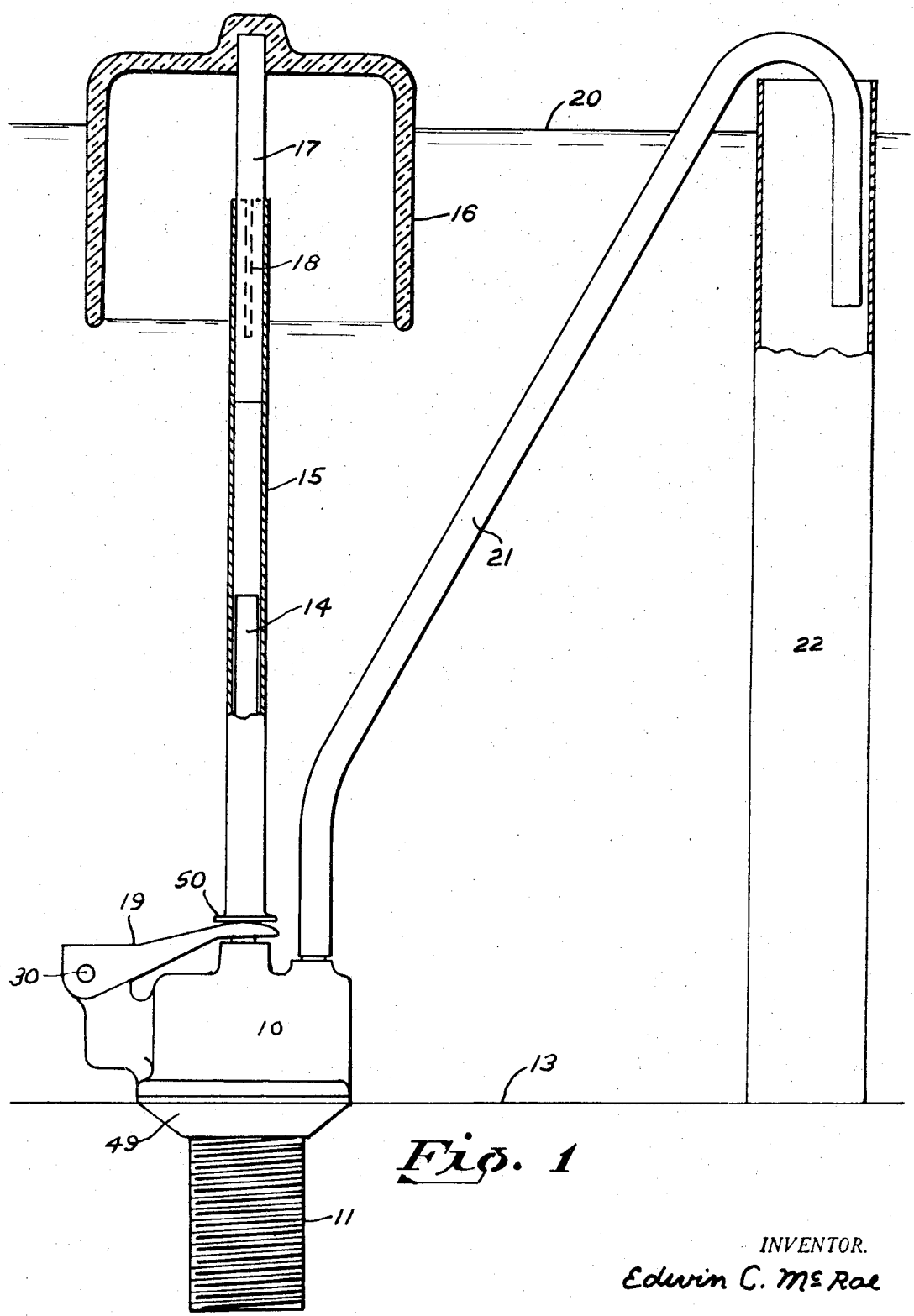
FIG. 1 is a full size plan view of my device, the float member being shown in section to better show how the water level may be adjusted.

Referring to the drawings, I have used the reference numeral 10 to indicate a valve housing having an externally threaded stem 11 formed integrally therewith. The stem 11 extends thru an opening in the bottom of a tank in which the valve is to be used and is sealed therein by a rubber gasket 49 and a nut 12. The bottom of the tank is shown diagrammatically in FIG. 1 and in cross section in FIG. 2. A float guiding rod 14 is secured to the housing 10 and extends several inches above the housing in axial alignment with the stem 11. A sleeve 15 is reciprocally mounted upon the rod 14 to freely move up and down relative to the housing 10. An inverted cup shaped float member 16 is formed, preferably of pressed glass, having a rod 17 cemented therein, which rod extends downwardly a short distance beyond the bottom rim of this float 16. The upper end of the sleeve 15 is slotted, as shown by dotted lines 18 and is slightly deformed so that it frictionly engages the rod 17. The float 16 and rod 17 may be manually moved up and down relative to the sleeve 15 for water level adjustment but when once adjusted the float 16, and rod 17 and sleeve 15 reciprocate up and down as a unit on the rod 14.

The lower end of the sleeve 15 is provided with a flange 50 which bears against a lever arm 19. The float 16, rod 17 and sleeve 15 are moved as a unit upwardly on the rod 14 when the water level in the tank causes the float to rise. By adjusting the sleeve lengthwise on the rod 17 the water level at which the float starts to rise varies. I have found that satisfactory operation under all domestic water pressures is obtained when the combined weight of the float 16, rod 17 and sleeve 15 is around 6 oz. and when the float displaces around 7 oz. of water when fully immersed. The normal water level in the associated tank is shown by line 20. When the water level reaches this line the float 16 will have been raised sufficiently to close my valve unit. At this time the float is about 90 percent immersed in the water. When the water level lowers even with the bottom of the float, the float will be entirely supported by the lever arm 19.

A tube 21 extends from the housing 10 to the upper end of an overflow pipe 22 which is associated with the tank in which the valve is installed. The tube 21 conducts about 5 percent of the water going thru the valve to the overflow pipe to build up the water level in the water closet trap to an effective height after the closet is flushed.

Figure 2:
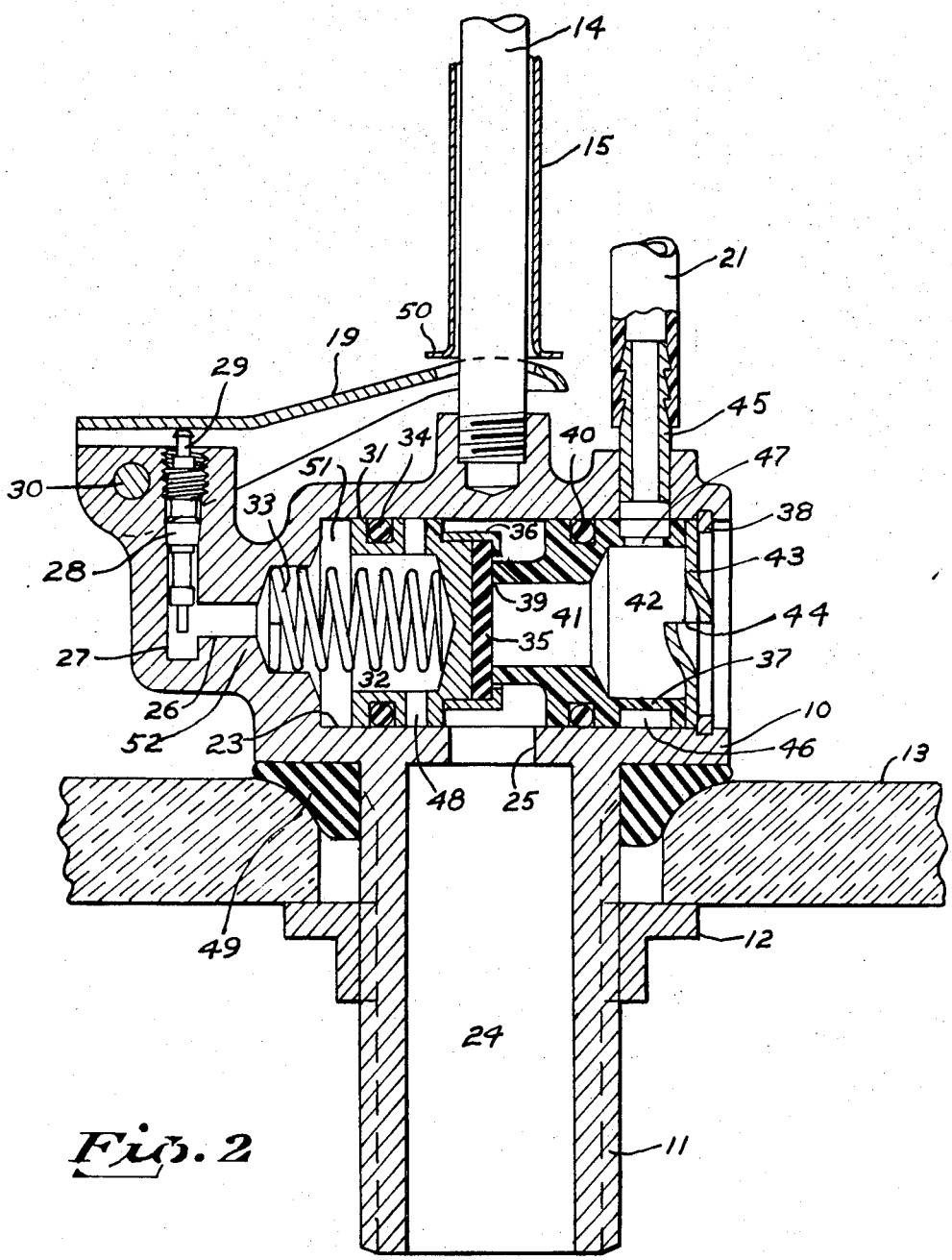
FIG. 2 is a central sectional view, twice size, showing the valve actuating mechanism.

Referring to FIG. 2 of the drawings, numeral 23 indicates a cylindrical bore 23 which is machined in the housing 10. One end of the bore 23 is closed by a portion of the housing 10, which portion I have identified as a first closure member 52 while the other end of said bore is closed by a spool shaped member which I have identified as a second closure member 37. The stem 11 has an annular opening 24 therein which communicates with a port 25 in the housing 10, the port 25 intersecting the bore 23 intermediate of its ends so that a clear passageway is provided thru the stem 11 into the bore 23. A drilled opening 26 is provided in the first closure 52 which extends to position where it intersects a vertical opening 27 formed in the housing 10. A conventional pneumatic valve core 28 is threaded into the upper end of the opening 27 and functions as a check valve. The valve 28, when closed, prevents fluid from flowing thru the openings 26 and 27 and, when open, permits fluid to flow there-thru from the bore 23. The valve 28 will not be described in detail as it is a standard commodity obtainable at gas stations or tire stores. It may, however, be well to mention that the valve core 28 is provided with a stem 29 which when pressed inwardly opens the valve, the valve being normally closed by internal spring mechanism within the core.

The arm 19 is pivotally mounted upon the housing 10 by pin 30 in such position that when the weight of the float 16 is applied to the arm, the arm will depress the stem 29 to open the valve 28. When the weight of the float 16 is removed from the arm 19 the stem 29 will raise the arm 19 and permit the valve 28 to close. A conventional pneumatic valve core is used instead of a manually operated check valve because such valve cores are easily and inexpensively obtained for replacement and because the effective area of such a valve core is small enough that a float weight of only a few ounces, acting thru the lever arm 19, will open the valve against water pressure up to 150 p.s.i.

A piston 31 is reciprocally mounted in the bore 23. The end of the piston 31 adjacent to the closure 52 has an annular recess 32 therein in which a compression spring 33 is mounted. The spring 33 exerts about one pound of pressure to urge the piston 31 away from the closure 52. An O ring seal 34 is inserted in an annular groove in the piston 31, which seal prevents fluid from leaking lengthwise along the piston 31. A rubber exhaust valve disc 35 is secured to the end of the piston adjacent to the closure 37 by means of a retaining ring 36. When the piston 31 moves about one-eighth inch away from the closure 52 the disc 35 contacts an exhaust valve seat to form a closure for this valve unit.

The second closure 37 is preferably formed as a Nylon spool shaped member which is inserted in the bore 23 and is held in place by a snap ring 38. An annular exhaust valve seat 39 is formed on the inner end of the spool 37 against which the disc 35 co-acts. An O ring 40 is mounted in a groove which extends around the spool 37 and prevents the water in the bore 23 from escaping between the spool 37 and the bore 23. An annular exhaust bore 41 extends axially thru the spool 37 from the seat 39 and terminates in an enlarged bore 42 in the spool 37. A plate 43 is inserted between the outer end of the spool 37 and the snap ring 38, said plate having a slot 44 therein which serves to restrict the flow of water from the opening 42 and deflect the water flowing therethrough to the bottom of the tank in which the valve is mounted. The slot 44 has an area of about half the area of the exhaust bore 41 and builds up a few pounds pressure in the bore 42. A nipple 45 extends radially from the bore 23 in position aligned with the enlarged bore 42 and is in constant communication with this bore thru a groove 46 and opening 47, both formed in the spool 37.

The pressure build up in the bore 42 is sufficient to force about 5 percent of the water which flows therethru upwardly thru the nipple 45 and tube 21 into the overflow pipe 32.

In order to actuate the piston 31 by the line water pressure a small amount of the water is conducted to the space between the first closure 52 and the piston 31. I have called this space a pressure chamber 51 because the amount of fluid pressure in this chamber determines whether the valve is open or closed. I have provided a metered opening to conduct this small amount of water to the pressure chamber. Where water under pressure must be metered a needle valve or small annular orifice is usually used but such needle valves or orifices readily become stopped by the grit in domestic water supply systems. To overcome this problem I have provided what I think is a novel metered opening and which is both cheap to machine and will not readily become pluged with grit. My metered opening comprises two diametrically opposite openings 48 which are drilled thru the cylindrical wall of the piston 31 to the recess 32 and which is longitudinally positioned between the exhaust valve end of the piston and the O ring 34. The bore 23 forms a partial closure for the outer ends of the openings 48. The diametral clearance between the bore 23 and piston 31 does, however, permit a small amount of water to flow from the intermediate portion of the bore 23 into the pressure chamber. When the check valve 28 is closed this restricted flow of water will build up pressure in the pressure chamber sufficient to overcome the differential line pressure on the outer end of the piston and move the piston to position where it closes the exhaust valve.

The piston 31 is machined to fit in the bore 23 with 0.002 to 0.004 inch diametral clearance. When the openings 48 are machined to 0.070 in. diameter this piston clearance will provide an effective orifice equal to an opening of 0.010 to 0.015 inches diameter. With this construction any grit that is small enough to move lengthwise between the piston and the bore 23 will be washed away when it encounters the relatively large opening 48. Furthermore, each valve cycle will tend to dislodge any grit that may enter around the periphery of the piston.

Two diametrically opposed openings 48 are provided instead of only one so that should the piston 31 not be exactly in the center of the bore 23 the flow of water thru the combined openings will not be affected thereby. The use of only one opening 48 will be satisfactory in some cases but it can cause a variation in the rate of valve closure if the piston is not exactly centered in the bore 23. The restriction offered by the metered openings 48 is not critical but it must be sufficient that the check valve 28, when opened, will cause the pressure in the pressure chamber 51 to decrease sufficiently that the differential line pressure on the disc end of the piston will move the disc to uncover the exhaust valve. In some installations it may be desirable to utilize the full annular clearance space between the piston and the bore as a metering orifice. However in such construction the clearance between the piston and bore 23 must be so small that the piston is apt to stick because of the minute particals of grit carried by domestic water systems. Of course, the check valve 28 may be made large enough to cause a pressure drop in the pressure chamber even when a large amount of water is permited to flow into the pressure chamber but as the check valve must be opened against line pressure an excessively heavy float will be required to open such valve.

When the valve unit is first installed the spring 33 maintains the piston 31 in its closed position with the disc 35 sealing the exhaust seat 39. When line pressure works against the differential area of the piston—that portion thereof which is greater than the area of exhaust bore 41 and valve seat 39—to force the piston inwardly against the urging of the spring 33. At this time there is no water in the tank so that the weight of the float 16 keeps the check valve 28 open. Water will flow thru the metered openings 48 but the check valve 28 being open will prevent a pressure build up in the chamber 51 sufficient to overcome the line pressure on the differential area of the piston.

The tank will continue to fill until the water therein raises the float 16. When this occurrs the check valve 28 will start to close. Pressure in the chamber 51 will gradually build up sufficient to move the piston 31 towards its closed position. When the valve disc 35 starts to restrict the flow of water thru the valve seat 39 the line pressure starts to increase. This causes a corresponding increase in the pressure in chamber 51. As the check valve 28 has a small but still effective area the increase in pressure in the chamber 51 will cause the piston 31 to move to its fully closed position and will fully close the check valve 28. When this occurs the pressure in chamber 51 will immediately increase to full line pressure to hold both the check valve 28 and the piston 31 firmly in their closed positions without further movement of the float 16. If the water flow thru the metered openings 48 was not restricted the valve would snap shut to cause a hammer in the supply line. The metered openings 48 are sufficiently restricted that the rate of valve closure is slowed down to where no hammering occurs.

If now the tank is flushed the water level will rapidly drop to open the valve and repeat the fill up cycle.

When once the tank is full it will ordinarily remain full until it is again flushed. However, should the flushing dump valve leak, as is often the case, the water level will slowly lower thereby gradually increasing the effective weight of the float. An important feature of this invention is that the water level must lower from one-half to 1 inch—depending upon the line pressure—to produce an effective float weight sufficient to crack open the check valve 28. In actual practice the check valve 28 will remain closed, due to the full line pressure acting upon its small but appreciable area until the effective weight of the float is sufficient to overcome this pressure. When the check valve just cracks open the pressure in the chamber 51 instantly drops, partly due to the friction of the O ring 34 which prevents the piston from moving due to small pressure changes and partly because pressure build up in the pressure chamber is restricted by the metered openings 48. In any event this drop in pressure in the pressure chamber causes the check valve to open still more without a further increase in the effective weight of the float. With the check valve 28 opened the valve seat 39 fully opens so that the drop in water level due to leakage is rapidly corrected to bring the water level up to where the valve normally shuts off. Wiredrawing across the valve seat is thereby prevented to thus prolong the life of the valve.

I claim as my invention:

1. In a valve for controlling the level of liquid in a tank, a valve housing having a cylindrical bore therein, and said housing having an inlet port therein which conducts liquid under pressure into said bore; a first closure for one end of said bore; a piston mounted in said bore for reciprocation therein between said first closure and said inlet port, the space within said bore and first closure and said piston forming a pressure chamber; a second closure closing the other end of said bore, said second closure having an exhaust port therein and having the portion thereof around said exhaust port forming an annular exhaust valve seat, said piston at one end of its stroke co-acting with said seat to close said valve, and said piston at the other end of its stroke being spaced from said exhaust valve seat to open said valve, the area enclosed by said exhaust valve seat being sufficiently smaller than the area of said piston that line pressure applied between said piston and said second closure will be effective only on the differential area of the piston to urge said piston away from said exhaust valve seat; a passageway extending from said pressure chamber to the atmosphere; a normally closed check valve in said passageway, which in its closed position prevents the flow of fluid thru said passageway and in its open position permits the flow of fluid thru said passageway; operable means for holding said check valve in its open position when the liquid level of fluid in said tank is below a predetermined height, said operable means permitting said check valve to close when the liquid level in said tank reaches said predetermined height; and a metered passageway which includes the annular clearance space between said piston and said bore for conducting line pressure to said pressure chamber, said annular clearance space sufficiently restricting said metered passageway that when said check valve is open the pressure in said chamber will be insufficient to move said piston against the line pressure on the differential area of said piston, and being sufficiently open that when said check valve is closed pressure will build up in said pressure chamber sufficient to move said piston to position where it closes said exhaust valve seat against the line pressure applied to the differential area at the other end of said piston.

2. A device, as claimed in claim 1, wherein said second closure comprises a spool shaped member which is sealed in said bore by an O ring and which is prevented from moving endwise in said bore by means of a snap ring.

3. A device, as claimed in claim 1, wherein said second closure comprises a spool shaped member which is hydraulicaly sealed in said bore and in which said exhaust valve port comprises an axial opening thru said spool, and which opening at the end of said spool opposite said exhaust valve seat is enlarged, and wherein a trap build up opening is provided in said housing which is in communication with said enlarged bore, and wherein a plate having a restricted opening therein partially obstructs the flow of liquid from said enlarged opening and forces a small percentage of the liquid flowing thru said enlarged bore into said trap build up opening.

4. A device, as claimed in claim 1, wherein said metered passageway comprises a laterally extending opening thru the cylindrical wall of said piston, which opening is partially obstructed by said bore and wherein said piston is provided with an O ring seal there around, said seal being positioned in said piston between the pressure chamber end of said piston and said opening.

5. A device, as claimed in claim 1, wherein a compression spring is positioned between said first closure and said piston, which spring moves said piston to position against said exhaust valve seat when there is no line pressure in said valve.

6. A device, as claimed in claim 1, wherein said operable means comprises an inverted cup shaped float member which has sufficient weight to open said check valve against the line pressure which is applied to said valve and which has sufficient volume that it will float when the water level in the tank reaches a predetermined height.

7. A device, as claimed in claim 1, wherein said operable means comprises an inverted cup shaped member having a first rod fixed thereto which extends downwardly from the inside of said cup member, a sleeve frictionally engaging said rod and second rod fixed to said housing in position extending vertically therefrom, said sleeve being mounted upon said second rod for free reciprocable movement relative thereto, the weight of said cup member and first rod and sleeve holding said check valve open when the water level in the tank is insufficient to float said cup member.

8. A device, as claimed in claim 1, wherein said normally closed check valve comprises a conventional pneumatic tire valve core.

* * * * *